(12) United States Patent
Weiss (10) Patent No.: US 8,864,164 B2
(45) Date of Patent: Oct. 21, 2014

(54) TUGGER ATTACHMENT

(75) Inventor: Mitchell Weiss, Carlisle, MA (US)

(73) Assignee: Seegrid Corporation, Pittsburgh, PA (US)

( * ) Notice: Subject to any disclaimer, the term of this patent is extended or adjusted under 35 U.S.C. 154(b) by 461 days.

(21) Appl. No.: 13/168,639

(22) Filed: Jun. 24, 2011

(65) Prior Publication Data

US 2012/0139209 A1 Jun. 7, 2012

Related U.S. Application Data (60) Provisional application No. 61/420,103, filed on Dec. 6, 2010.

(51) Int. Cl.
| | | |
|---|---|---|
| *B60D 1/04* | (2006.01) | |
| *B66F 9/12* | (2006.01) | |
| *B66F 9/18* | (2006.01) | |
| *B62B 5/00* | (2006.01) | |
| *B62B 3/06* | (2006.01) | |

(52) U.S. Cl.
CPC ........... *B62B 5/0079* (2013.01); *B62B 2207/00* (2013.01); *B62B 3/06* (2013.01)
USPC ..................... 280/504; 280/415.1; 280/446.1; 280/452; 414/607

(58) Field of Classification Search
CPC ............ B60D 1/04; B60D 1/07; B60D 1/075; B62B 3/06; B62B 3/0612; B62B 3/0643; B62D 51/04; B66F 9/07504
USPC ......... 180/19.1, 19.2, 19.3; 280/415.1, 416.1, 280/446.1, 452, 453, 482, 491.1, 495, 497, 280/504, 515; 414/607, 608, 785
See application file for complete search history.

(56) References Cited

U.S. PATENT DOCUMENTS

| | | | | |
|---|---|---|---|---|
| 2,809,759 | A | * | 10/1957 | Manker ......................... 414/607 |
| 3,396,862 | A | * | 8/1968 | Fischer ......................... 414/607 |
| 4,065,013 | A | | 12/1977 | Orthman |
| 5,096,018 | A | | 3/1992 | Dickinson, Jr. |
| D337,410 | S | * | 7/1993 | Jones ............................. D34/28 |
| 5,692,583 | A | * | 12/1997 | Reed et al. .................... 187/237 |
| 6,135,701 | A | * | 10/2000 | Galloway, Sr. ................ 414/607 |

(Continued)

FOREIGN PATENT DOCUMENTS

WO 2012/078550 6/2012

OTHER PUBLICATIONS

International Search Report and Written Opinion issued on Jul. 30, 2012 in corresponding International Application No. PCT/US2011/063390.

(Continued)

*Primary Examiner* — Joseph M Rocca
*Assistant Examiner* — Marc A Scharich
(74) *Attorney, Agent, or Firm* — Onello & Mello LLP (57) ABSTRACT

Provided is a tugger attachment apparatus configured for use with a pallet transport. The pallet transport has a front drive portion and a rear load portion having a pair of forks. The tugger attachment includes a body, a fork coupling member at a bottom side of the body that is configured to secure the body to the forks, and a hitch supported by the body. A linkage can be provided that opens and closes the hitch in response to raising and lowering of the forks of the pallet transport.

12 Claims, 8 Drawing Sheets

(56) References Cited

U.S. PATENT DOCUMENTS

| | | | |
|---|---|---|---|
| 6,390,489 B1 * | 5/2002 | Friesen | 280/504 |
| 6,467,789 B1 * | 10/2002 | Schedler et al. | 280/408 |
| 8,454,295 B2 * | 6/2013 | Balcom | 414/607 |
| 2002/0154982 A1 | 10/2002 | Schedler et al. | |
| 2008/0164101 A1 | 7/2008 | Stone | |

OTHER PUBLICATIONS

CIC/MHE, webpage, Material Handling Equipment, "I-C. Industrial Trucks", Sep. 30, 1999, 11 pgs.

Extended European Search Report in corresponding European Application No. 11846146, dated Jul. 3, 2014.

* cited by examiner

TUGGER ATTACHMENT

CROSS REFERENCE TO RELATED APPLICATIONS

This application claims the benefit of priority under 35 U.S.C. §119(e) from provisional application Ser. No. 61/420,103, entitled Tugger Attachment, filed on Dec. 6, 2010, which is incorporated herein by reference in its entirety.

FIELD OF INTEREST

The present inventive concepts relate generally to the field of warehouse equipment, and more particularly to equipment used to transport objects within a warehouse or similar environment.

BACKGROUND

A warehouse is a facility primarily used for storage of goods for commercial purposes. The storage is generally intended to be temporary; as such goods ultimately may be intended for a retailer, consumer or customer, distributor, transporter or other subsequent receiver. A warehouse can be a standalone facility, or can be part of a multi-use facility. Thousands of types of items can be stored in a typical warehouse. The items can be small or large, individual or bulk. It is common to load items on a pallet for transportation, and the warehouse may use pallets as a manner of internally transporting and storing items.

A well-run warehouse is well-organized and maintains an accurate inventory of goods. Goods can come and go frequently, throughout the day, in a warehouse. In fact, some large and very busy warehouses work three shifts, continually moving goods throughout the warehouse as they are received or needed to fulfill orders. Shipping and receiving areas, which may be the same area, are the location(s) in the warehouse where large trucks pick-up and drop-off goods. The warehouse can also include a staging area—as an intermediate area between shipping and receiving—and storage aisles and areas within the warehouse where the goods are stored. The staging area, for example, can be used for confirming that all items on the shipping manifest were received in acceptable condition. It can also be used to assemble or otherwise prepare orders for shipping.

Goods in a warehouse tend to be moved in one of two ways, either by pallet or by cart (or trailer). A pallet requires a pallet transport for movement, such as a pallet jack, pallet truck, forklift, or stacker. A stacker is a piece of equipment that is similar to a fork lift, but can raise the pallet to significantly greater heights, e.g., for loading a pallet on a warehouse shelf. A cart requires a tugger (or "tow cart"), which pulls the cart from place to place.

A pallet transport can be manual or motorized. A traditional pallet jack is a manually operated piece of equipment, as is a traditional stacker. When a pallet transport is motorized, it can take the form of a powered pallet jack, pallet truck, or forklift (or lift truck). A motorized stacker is referred to as a power stacker. A motorized pallet jack is referred to as a powered pallet jack, which an operator cannot ride, but walks beside. A pallet truck is similar to a powered pallet jack, but includes a place for an operator to stand.

As with motorized pallet transports, a tugger can be in the form of a drivable vehicle or in the form of a powered vehicle along the side of which the operator walks. In either form, a tugger includes a hitch that engages with a companion part on the cart, such as a sturdy and rigid ring or loop.

Automatic guided vehicle (AGV) forms of pallet trucks and powered tuggers exist. An AGV is a mobile robot that follows markers or wires in the floor, or uses vision or lasers to make its way without direct or remote control by an operator. They are most often used in industrial applications to move materials around a manufacturing facility or a warehouse, such as in the case of AGV forklifts and AGV tuggers.

To date, pallet transports and tuggers represent two distinct types of equipment. In the case of powered equipment, such units are not only expensive to purchase or lease, but can also be expensive to maintain. For this reason, motorized pallet transports and tuggers tend to be in short supply in a warehouse, and if such a unit becomes inoperable, the efficiency of the warehouse is naturally negatively impacted. Such negative impacts can ripple though the supply chain, as an underperforming warehouse can cause delays in receiving and shipping of goods.

Figure 1:
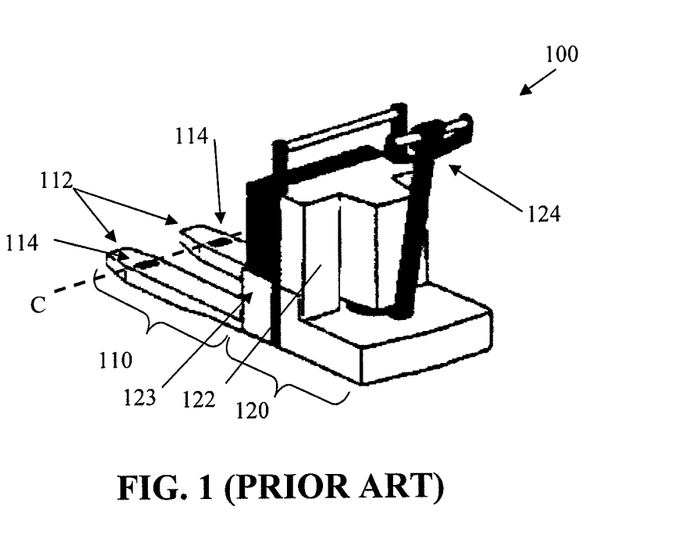
FIG. 1 is a perspective view of a prior art pallet truck.

FIG. 1 is a perspective view of a pallet truck 100, as an example. The pallet truck 100 includes a rear load portion 110, where a pair of forks 112 is located to engage and lift a pallet. The forks 112 can be raised and lowered. As is known in the art, the forks 112 are lowered to engage the pallet, and then raised to lift the pallet from the floor. Once the pallet is raised, the pallet truck 100 can transport the pallet to another location, using load wheels 114 located in distal ends of the forks 112. Wheels 114 share a common axis, represented by centerline C.

The pallet truck 100 includes a front drive portion 120 that includes a housing 122, within which may be located a motor and drive mechanism (not shown). Within or adjacent to housing 122 is a battery 123. Pallet truck 100 is controlled using a drive control arm 124, which includes start, drive, and stop mechanisms. A wheel (not shown) is also located in the front drive portion 120, usually beneath a linkage (not shown) at the bottom of drive control arm 124.

SUMMARY OF INVENTION

In accordance with one aspect of the present invention, provided is a tugger attachment configured for use with a pallet transport. The pallet transport has a drive portion and a load portion having a pair of forks. The tugger attachment includes a body; a fork coupling member configured to secure the body to the forks; and a hitch supported by or coupled to the body.

The tugger attachment can be configured so that, when the tugger attachment is loaded onto the forks, the hitch is disposed substantially midway between a set of load wheels located in an end of the forks distal from the drive portion.

The tugger attachment can be configured so that, when the tugger attachment is loaded onto the forks, the hitch is disposed not beyond a centerline of a set of load wheels located in an end of the forks distal from the drive portion.

A length of the body can be such that when fully engaged by the forks, the body extends from a vertical face of the load portion of the pallet transport and places the hitch substantially at the centerline of the set of the load wheels.

The tugger attachment can further include a front coupling member that attaches the body to the pallet transport, proximate to where the drive portion meets the load portion.

The tugger attachment can further include a linkage assembly configured to couple the hitch to the forks, such that raising the forks closes the hitch and lowering the forks opens the hitch.

The linkage assembly can include a lever having a first end with an idler wheel that engages one of the load wheels; a linking member connected between a second end of the lever and a coupler hook of the hitch; and a pivot bolt located between the lever first and second ends, about which the lever pivots in response to a pulling force of the linking member.

The body can define a storage cavity.

A length of the body can be variable.

The tugger attachment can include at least one pallet transport hinge mechanism that couples the tugger attachment to the pallet transport, and is configured to enable the tugger attachment to be rotated away from the forks.

The pallet transport can be a pallet truck, fork lift, or pallet jack.

In accordance with another aspect of the invention, provided is a hitch for use with a pallet transport having a pair of forks. The hitch includes a coupler that has a movable coupler hook; a connection point formed on the coupler hook; and a linkage assembly coupling the connection point of the coupler hook to at least one fork from the pair of forks, such that raising the pair of forks closes the hitch and lowering the forks opens the hitch.

The linkage assembly can include a lever having a first end with an idler wheel that engages a load wheel of the at least one fork; a linking member connected between a second end of the lever and the connection point of the coupler hook; and a pivot bolt located between the lever first and second ends, about which the lever pivots in response to a pulling force of the linking member.

In accordance with another aspect of the invention, provided is a method of adapting a pallet transport for use as a tugger, the pallet transport having a drive portion and a load portion having a pair of forks. The method includes coupling a tugger attachment to the pair of forks of the pallet transport. The tugger attachment includes a body; a fork coupling member configured to secure the body to the forks; and a hitch coupled to or supported by the body.

The method can further comprise loading the tugger attachment onto the forks, such that the hitch is disposed substantially midway between a set of load wheels located in an end of the forks distal from the drive portion.

The method can further comprise loading the tugger attachment on the forks such that the hitch is disposed not beyond a centerline of a set of load wheels located in an end of the forks distal from the drive portion.

The method can further comprise using a front coupling member of the tugger attachment to attach the body to the pallet transport, proximate to where the drive portion meets the load portion.

The method can further comprise using a linkage assembly of the tugger attachment to couple the hitch to the forks, such that raising the forks closes the hitch and lowering the forks opens the hitch.

The method can further comprise adjusting a length of the body to position the hitch proximate to the load wheels.

The method can further comprise coupling the tugger attachment to the pallet transport with a hinge that enables the tugger attachment to be rotated away from the forks.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. In the drawings.

DETAILED DESCRIPTION OF PREFERRED EMBODIMENT

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements may be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Figure 2:
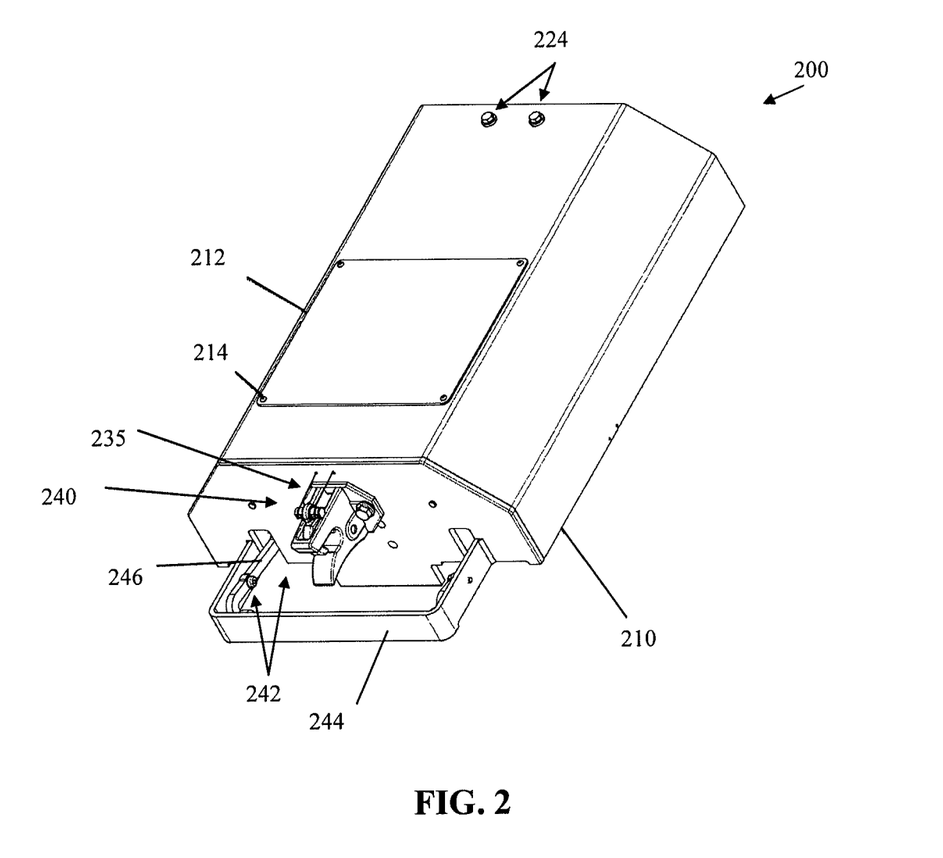
FIG. 2 is a perspective view of a tugger attachment, in accordance with aspects of the present invention.

FIG. 2 is a perspective view of a tugger attachment 200, in accordance with aspects of the present invention. Tugger attachment 200 is configured to removably attach to forks of a pallet transport. Tugger attachment 200 includes a body 210, a fork coupling member (see FIG. 5A) at a bottom side of body 210, and a hitch 240 coupled to or supported by the body 210. Hitch 240 can take the form of a cast iron coupling, e.g., Model 24 Coupling from Premier Manufacturing Company. The fork-coupling apparatus is configured to secure to the forks of the pallet transport, such as the pallet truck shown in FIG. 1.

In this embodiment, hitch 240 includes, or is augmented by, a linkage assembly 242 (partially shown) that functionally couples the hitch 240 to the forks, such that raising the forks closes the hitch and lowering the forks opens the hitch. Also in this embodiment, a protective bar 244 wraps around levers 246 of the linkage assembly 242, where the levers 246 are functionally coupled to the hitch 240 using a linking member, such as cables 235. The protective bar 244 protects the linkage assembly 242 and hitch 240 from impacts.

In the preferred embodiment, the body 210 is made of a rugged material, e.g., steel, that provides a stable support for the hitch 240. In this figure, the body 210 takes the form of a rigid box. However, in other embodiments, body 210 can take the form of a rigid frame, which does not form an enclosure. In various embodiments, the length of the body 210 may be made adjustable to enable selectable positioning of the hitch 240 with respect to load wheels 114 of the pallet transport.

In this embodiment, the body 210 defines a cavity 212 configured for storage, e.g., to receive one or more traction weights. The cavity is covered by a hatch door 214, in this embodiment. The hatch door 214 can be secured to the rest of body 210 by, for example, four hexagon socket button head cap screws, or by other known securing mechanisms.

Figure 3:
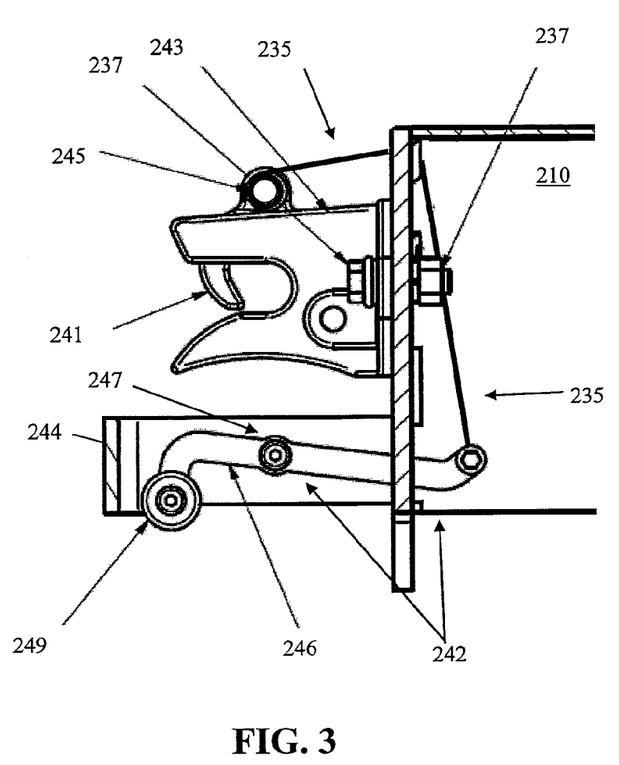
FIG. 3 is a side view of the hitch and linkage assembly of the tugger attachment of FIG. 2 taken along lines A-A in FIG. 6.
Figure 4:
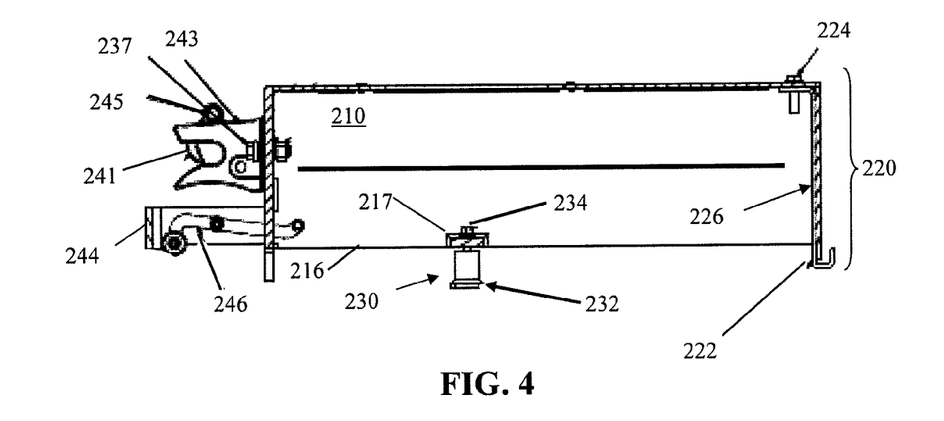
FIG. 4 is a cross-sectional side view of the tugger attachment of FIG. 2, taken along lines A-A in FIG. 6.
Figure 6A:
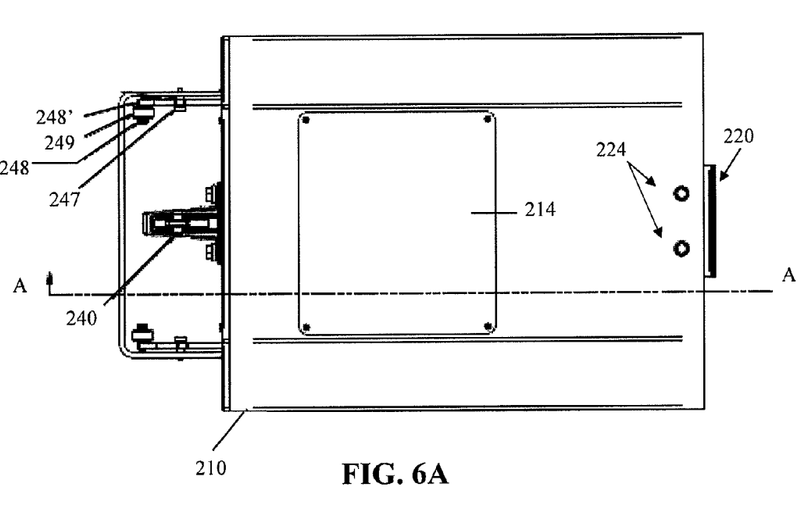
FIG. 6A is a top view of the tugger attachment of FIG. 2

FIGS. 3 and 4 are cross-sectional side views of the tugger attachment 200 of FIG. 2, taken along line A-A in FIG. 6A.

FIG. 3 is a cross-sectional side view of the hitch 240, linkage assembly 242, and a portion of body 210 of the tugger attachment of FIG. 2. The hitch 240 includes a coupler 243 that has a movable coupler hook 241 that opens and closes to engage a cart or the like. The hitch is attached to the body 210 with bolts 237, but could be attached in other ways, such as welding, brazing, and the like. The coupler hook 241 includes a connection point 245, e.g., an eyelet.

In this embodiment, linkage assembly 242 includes cable 235 having a first end that attaches to connection point 245 of hitch 240. Cable 235 passes through an opening in the body 210, and a second end of cable 235 connects to a lever 246. Lever 246 also passes through body 210 and attaches to protection bar 244 via a pivot bolt 247. An idler wheel 249 is attached to an opposite end of lever 246 and engages with a fork when the tugger attachment 200 is loaded on a pallet transport. In this embodiment, therefore, linkage assembly 242 can include cable 235 and lever 246 with pivot bolt 247 and idler wheel 249. The linkage assembly could include two lever 246, pivot bolt 247, and idler wheel 249 combinations, one for each fork, as in various embodiments shown herein. But in other embodiments, only one such combination may be used.

In operation, when the tugger attachment 200 is loaded onto a pallet transport, such as pallet truck 100, the idler wheel 249 is at rest on a load wheel 114 of fork 112. When the forks are raised, the fork wheels remain on the ground and the idler wheel 249 remains at rest, while the body 210 and hitch 240 are raised with the forks. This causes the lever 246 to rotate about pivot bolt 247 and reduce tension on cable 235, which in turn lowers coupler hook 241 into the closed position. Conversely, when the forks are lowered, the lever 246 is rotated in the opposite direction, which applies tension to cable 235, which in turn pulls open coupler hook 241. As a result, the coupler hook 241 is automatically opened and closed with the lowering and raising of the forks.

FIG. 4 is a cross-sectional side view of the tugger attachment 200, also take along line A-A. The view of FIG. 4 is more complete with respect to body 210 than the view of FIG. 3. As is shown, at a front side of body 210, there is located a front coupling member 220 that attaches the body 210 to a front portion of the pallet transport, proximate to where the front drive portion meets the rear load portion. The front coupling member 220, in this embodiment, includes a hook 222 at a bottom 216 (e.g., plate) of the body, which is connected to one or more tightening bolts 224 at a top of the body 210. Tightening bolts 224 are coupled to the hook 222 through a linkage 226. In this embodiment, turning the tightening bolts 224 in a first direction raises hook 222 via linkage 226. Hook 222 engages a companion portion of the pallet transport, such as pallet truck 100. The companion portion can be a lip or other indentation formed at a bottom of a vertical surface (or face) 118 of the load portion 110 or a back end of the front portion 120 of pallet truck 100. (see, e.g., FIGS. 7 and 8) Turning bolts 224 in a second, opposite direction lowers the hook 222—disengaging the tugger attachment 200 from the front portion 120 of the pallet truck 100.

Also visible from the side view is fork coupling member 230 disposed at the bottom 216 of the tugger attachment 200, which aids in securing the tugger attachment 200 to the forks of a pallet transport. In this embodiment, fork coupling member 230 includes a cleat 232 that is raised and lowered by turning one or more bolts 234. Bolts 234 are accessible from the cavity 212 of body 210, via hatch door 214.

Figure 5A:
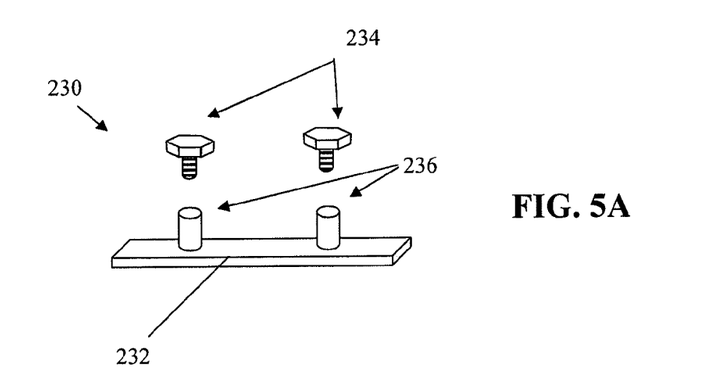
FIG. 5A is an exploded view of an embodiment of a fork coupling member, such as that shown in FIG. 4.

FIG. 5A is an exploded view of an embodiment of a fork coupling member 230, such as that shown in FIG. 4. In this embodiment, the fork coupling member 230 includes cleat 232, which includes two internally threaded sockets 236. Two mating bolts 234 are used to secure the cleat 232 to cross member 217 at the bottom 216 of body 210, and to raise the cleat 232 to couple to forks 112. Bolts 234, in this embodiment, are accessible via hatch door 214 in tugger attachment body 210. But in other embodiments, for example if body 210 took the form of a skeletal frame, bolts 234 could be directly accessible.

The cleat 232 can be loose when tugger attachment 200 is initially loaded onto forks 112. Bolts 234 are then tightened to raise the cleat against undersides of forks 112 until the body 210 is sufficiently secured to the forks 112, and then loosened to remove tugger attachment 200.

The fork coupling member 230 is preferably made from a rugged material suitable for securing the body (and hitch) to the pallet transport, such as steel or iron—particularly suited for pulling typical heavy warehouse grade loads.

Figure 5B:
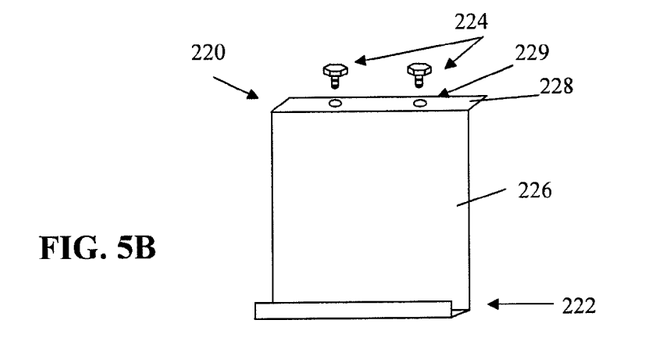
FIG. 5B is an exploded view of an embodiment of a front coupling member, such as that shown in FIG. 4.
Figure 6B:
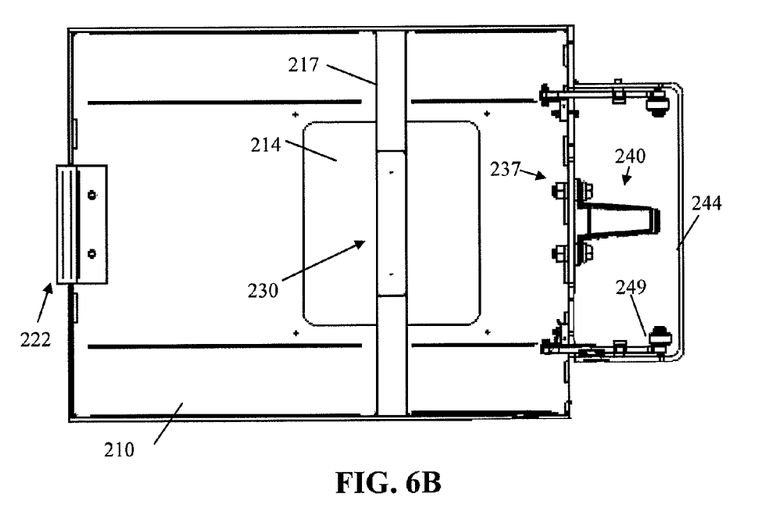
FIG. 6B is a bottom view of the tugger attachment of FIG. 2, in accordance with aspects of the present invention.

FIG. 5B is an exploded view of an embodiment of front coupling member 220, such as that shown in FIGS. 4, 6A, and 6B. Fork coupling member 220 includes bottom hook 222 that is configured to engage a portion of the pallet transport. Hook 222 is connected to tightening bolts 224 through a linkage 226. A top plate 228 is also included with two threaded holes 229 that receive bolts 224. Here, plate 228, linkage 226, and hook 222 are formed as a single rigid piece of material, e.g., steel.

As can be seen from FIG. 4, linkage 226 and top plate 228 reside inside tugger body 210 in this embodiment. Hook 222 and bolts 224 reside outside of body 210. Thus, an opening is formed in a bottom of the tugger body 210 to accommodate passage of linkage 226. And holes are formed in a top of body 210 to accommodate passage of bolts 224 so that they can engage threaded holes 229.

FIG. 6A is a top view of the tugger attachment of FIG. 2. Many of the elements shown in FIG. 6A are described above, so are not again described here. In this view, the hitch 240, protective bar 244, idler wheels 249, and fork coupling member 230 are at least partially visible. In FIG. 6A, the idler wheel is attached to lever 246 using a bolt 248 and nut 248' combination. Other connection mechanisms could be used in other embodiments.

From this view, the preferred location of the hitch 240 in this embodiment can be seen. Hitch 240 is centrally located, such that the hitch 240 is located between the forks when the tugger attachment 200 is attached to a pallet transport.

FIG. 6B is a bottom view of the tugger attachment of FIG. 2, where bottom 216 is transparent. In this view, details of front coupling member 220 and fork coupling member 230 are visible. For example, this view shows a bottom view of cross member 217 disposed within body 210. Fork coupling member 230 couples to cross member 217 using bolts 234 (see also FIG. 5A). Additionally, use of bolts 237 for attachment of hitch 240 to the body 210 is visible.

Figure 7:
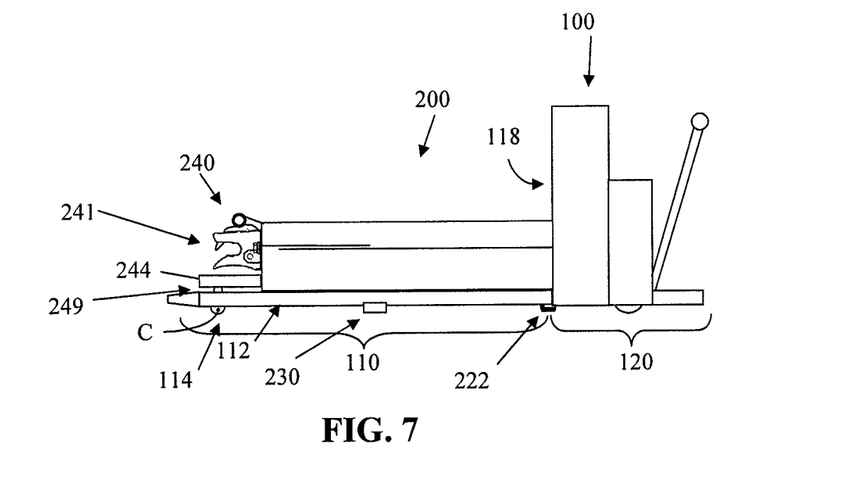
FIG. 7 is a side view of the tugger attachment of FIG. 2 loaded on the pallet truck of FIG. 1, with the forks in a lowered position, in accordance with aspects of the present invention.
Figure 8:
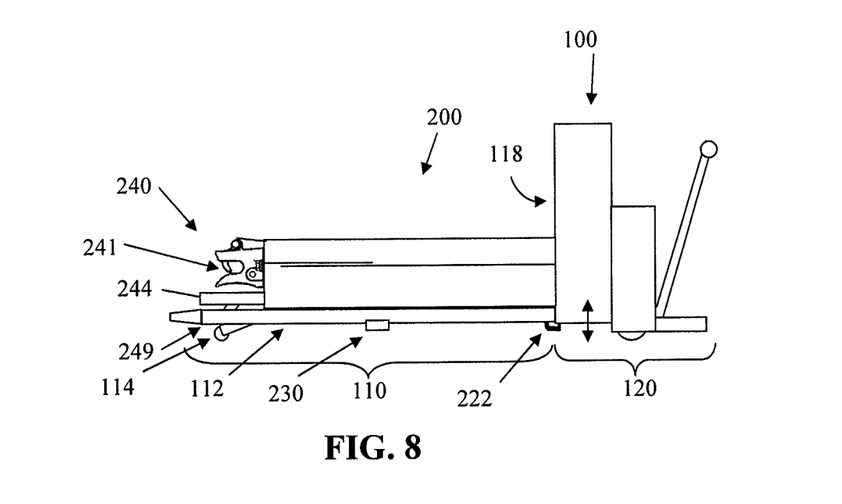
FIG. 8 is a side view of the tugger attachment of FIG. 2 loaded on the pallet truck of FIG. 1, with the forks in a raised position, in accordance with aspects of the present invention.

FIGS. 7 and 8 show the tugger attachment 200 loaded on a pallet truck, such as pallet truck 100 from FIG. 1. In this embodiment, a length of the body 210 is chosen so that when fully engaged by the forks, the body 210 extends from a vertical face 118 of the load portion of the pallet transport and places the hitch not beyond wheels disposed within distal ends of the forks. For example, as shown in FIGS. 7 and 8, when tugger attachment 200 is loaded on pallet truck 100 shown in FIG. 1, the hitch 240 could be substantially above centerline C, with the body 210 extending from a vertical face 118 of the rear load portion 110 to a position proximate to the wheels 114.

FIG. 7 shows an embodiment where the coupler hook 241 is open when the forks 112 are lowered, ready to accept a cart or the like. FIG. 8 shows the coupler hook 241 closed when the forks 112 are raised, to secure a cart or the like. Thus, in this embodiment, raising and lowering the forks 112 causes the coupler hook 241 to close and open. This is accomplished through the linkages shown and described with respect to FIGS. 3 and 4.

Figure 9A:
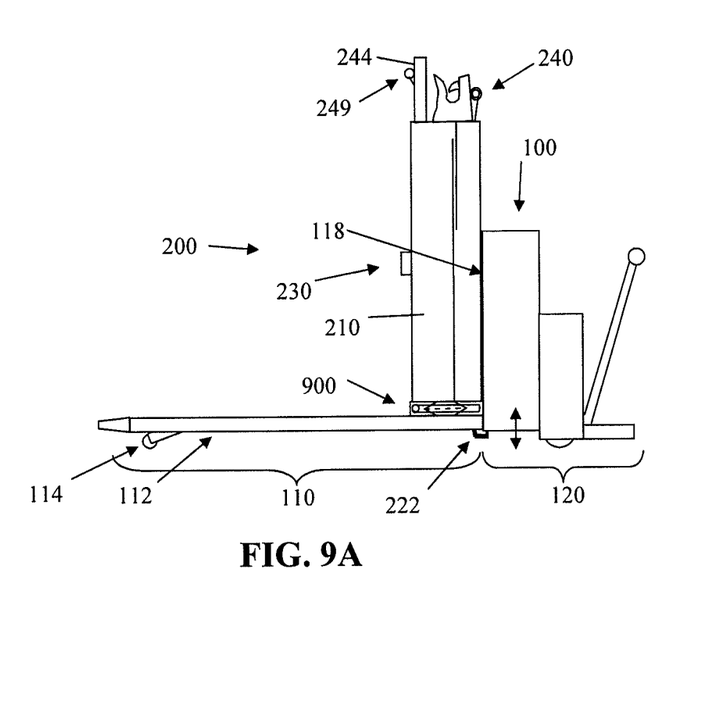
FIGS. 9A through 9C provide side views of a tugger attachment with an embodiment of a hinge mechanism loaded on the pallet truck of FIG. 1, in accordance with aspects of the present invention.
Figure 9B:
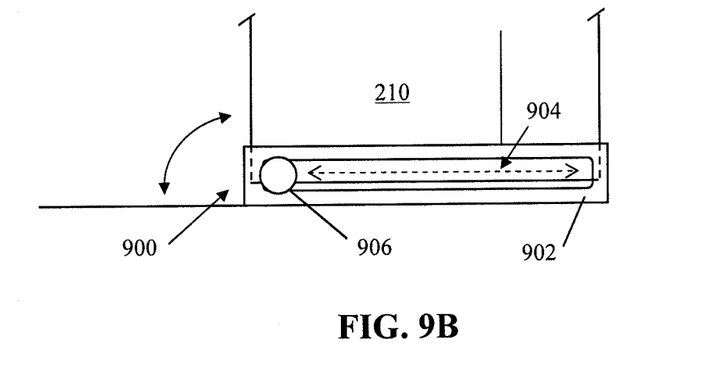
Figure 9C:
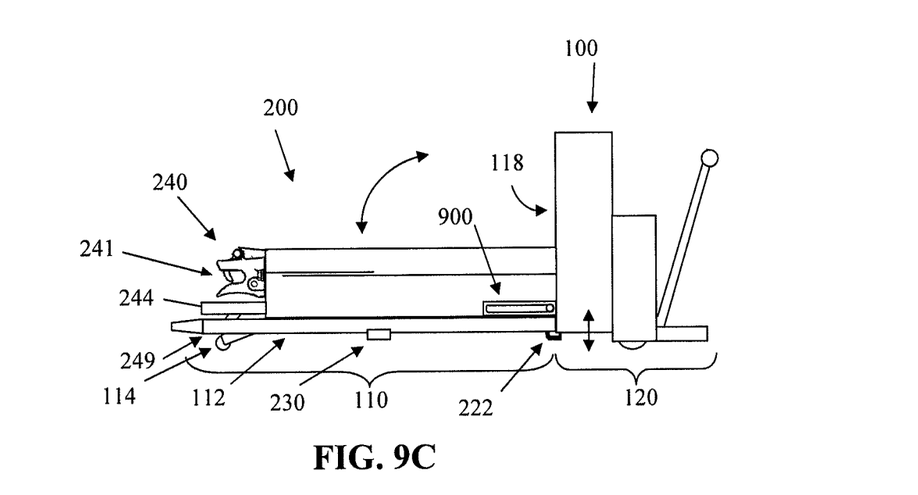

As is shown in FIGS. 9A, 9B, and 9C, in various embodiments, the tugger attachment could be configured to secure to the forks in a manner that allows it to selectively rotate to a substantially upright position, e.g., against vertical face 118 of the rear load portion 110. Thus, a portion of the body can be secured to the forks and another portion of the body supporting the hitch 240 can be hinged near vertical face 118. This configuration preferably allows the pallet transport to be used to carry pallets in one instance, and then be easily adapted to perform as a tugger by folding down the tugger attachment.

FIG. 9A is a side view of the tugger attachment 200 loaded on a pallet truck of FIG. 1, with the forks in a raised position, and including a hinge mechanism 900, in accordance with aspects of the present invention. In this embodiment, hinge mechanism 900 enables the tugger attachment 200 to be rotated up and away from forks 112. Rotating the tugger attachment in this manner preferably allows the forks to be used for another load, e.g., a pallet, without removal of the tugger attachment.

FIG. 9B is a side view of the hinge mechanism 900 of FIG. 9A, in accordance with aspects of the present invention. In this embodiment, a bracket 902 is disposed on, or coupled to, the forks 112. There is a pathway 904 defined within the bracket 902. A pin, post or axle with wheel or other end portion (collectively, or individually, a post 906) is provided as part of or coupled to the tugger attachment body 210. At least a portion of post 906 travels through pathway 904 to accommodate rotation of the tugger attachment between a first position on forks 112 and a second position shown in FIGS. 9A and 9B. FIG. 9C shows the tugger attachment 200 with hinge mechanism 900 with the tugger attachment 200 disposed on the forks 112 (e.g., as in FIG. 8).

Figure 10:
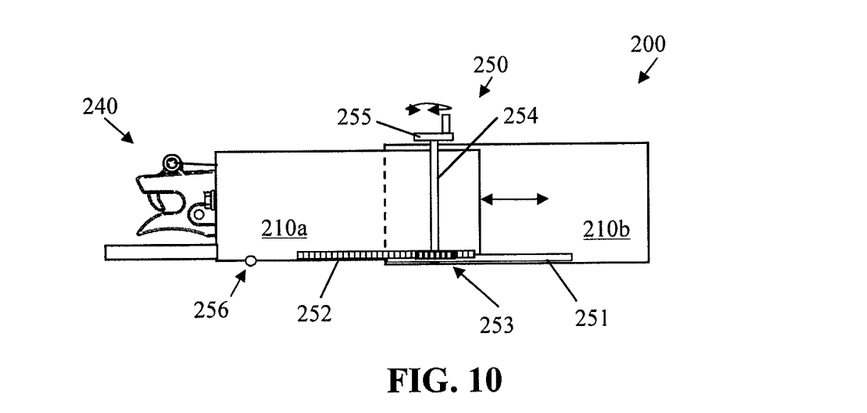
FIG. 10 is a side view of an embodiment of a tugger attachment having adjustable length, in accordance with aspects of the present invention.

In various embodiments, the length of the tugger attachment can be variable. FIG. 10 is a side view of an embodiment of a tugger attachment 200 having adjustable length, in accordance with aspects of the present invention. For example, the body 210 could be formed of two pieces 210a and 210b. A linear translation mechanism 250 can be provided to enable one piece to be translatable (or slidable) with respect to the other.

In this embodiment, hitch (or rear) body piece 210a is translatable with respect to front body piece 210b. Thus, front body piece 210b can be secured to forks 112 of a pallet transport, and then the length of the tugger attachment can be adjusted by linear displacement of rear body piece 210a. Then rear body piece can be locked into place for use. In this embodiment, fork coupling member 230 (not shown) can be part of rear body piece 210a, front body piece 210b, or there can be a different fork coupling member 230 for each of rear body piece 210a and front body piece 210b.

A linear translation of one body piece with respect to another body piece can be achieved by any of a variety of linear translation mechanisms 250, e.g., a hand crank, motor, pull handle, or the like. In this embodiment, a guide rail 251 or similar device is included in the front body piece 210b to guide the respective linear displacement of the rear body piece 210a. A tongue and groove rail 252 can be disposed in rear body piece 210a, with a mating tongue and groove wheel 253 provided in front body piece 210b. A shaft 254 can connect the tongue and groove wheel 253 to a hand crank 255, wherein turning hand crank 255 rotates the tongue and groove wheel 253, via shaft 254, to cause linear translation and displacement of rear body piece 210a. A support member (e.g., a wheel) 256 can be located in the rear body piece 210a to engage two forks 112 of the pallet transport. The present invention is not limited to the linear translation mechanism shown and described with respect to FIG. 10, other linear translation mechanisms could be used in other embodiments.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A tugger attachment configured for use with a pallet transport, the pallet transport having a drive portion and a load portion having a pair of forks, the tugger attachment comprising:
  a body;
  a fork coupling member configured to secure the body to the forks;
  a hitch coupled to the body, wherein the hitch is configured to open and close; and
  a linkage assembly configured to couple the hitch to the forks, wherein raising the forks closes the hitch and lowering the forks open the hitch.

2. The tugger attachment of claim 1, wherein the tugger attachment is configured so that, when the tugger attachment is loaded onto the forks, the hitch is disposed substantially midway between a set of load wheels located in an end of the forks distal from the drive portion.

3. The tugger attachment of claim 1, wherein the tugger attachment is configured so that, when the tugger attachment is loaded onto the forks, the hitch is disposed not beyond a centerline of a set of load wheels located in an end of the forks distal from the drive portion.

4. The tugger attachment of claim 3, wherein a length of the body is such that when fully engaged by the forks, the body extends from a vertical face of the load portion of the pallet transport and places the hitch substantially at the centerline of the set of load wheels.

5. The tugger attachment of claim 1, further comprising:
a front coupling member that attaches the body to the pallet transport, proximate to where the drive portion meets the load portion.

6. The tugger attachment of claim 1, wherein the linkage assembly comprises:
a lever having a first end with an idler wheel that engages one of a load wheel of one of the forks;
a linking member connected between a second end of the lever and a coupler hook of the hitch; and
a pivot bolt located between the first and second ends of the lever, about which the lever pivots in response to a pulling force of the linking member.

7. The tugger attachment of claim 1, wherein the body defines a storage cavity.

8. The tugger attachment of claim 1, wherein the pallet transport is a pallet truck.

9. The tugger attachment of claim 1, wherein a length of the body is variable.

10. The tugger attachment of claim 1, further comprising:
at least one pallet transport hinge mechanism that couples the tugger attachment to the pallet transport, and configured to enable the tugger attachment to be rotated away from the forks.

11. A hitch for use with a pallet transport having a pair of forks, comprising:
a coupler that has a movable coupler hook;
a connection point formed on the coupler hook; and
a linkage assembly coupling the coupler hook to at least one fork from the pair of forks, such that raising the pair of forks closes the coupler and lowering the forks opens the coupler.

12. The hitch of claim 11, wherein the linkage assembly comprises:
a lever having a first end with an idler wheel that engages a load wheel of the at least one fork;
a linking member connected between a second end of the lever and the connection point of the coupler hook; and
a pivot bolt located between the first and second ends of the lever, about which the lever pivots in response to a pulling force of the linking member.

* * * * *